Oct. 14, 1930.  N. W. LITTLEJOHN  1,778,365
TRANSMISSION
Filed Aug. 3, 1927  2 Sheets-Sheet 2
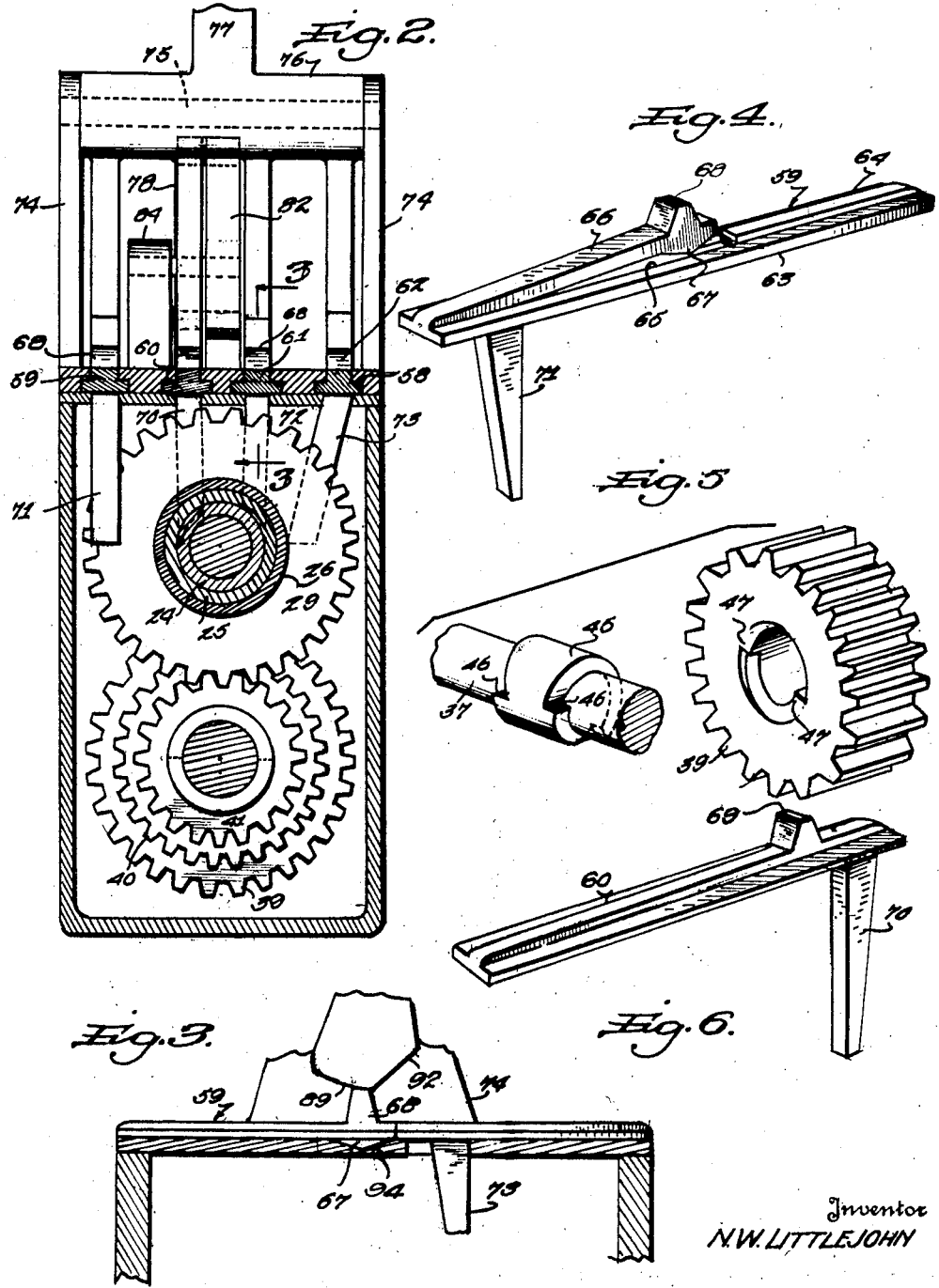
Inventor
N.W. LITTLEJOHN
By
G.W. Earnshaw
Attorney Patented Oct. 14, 1930

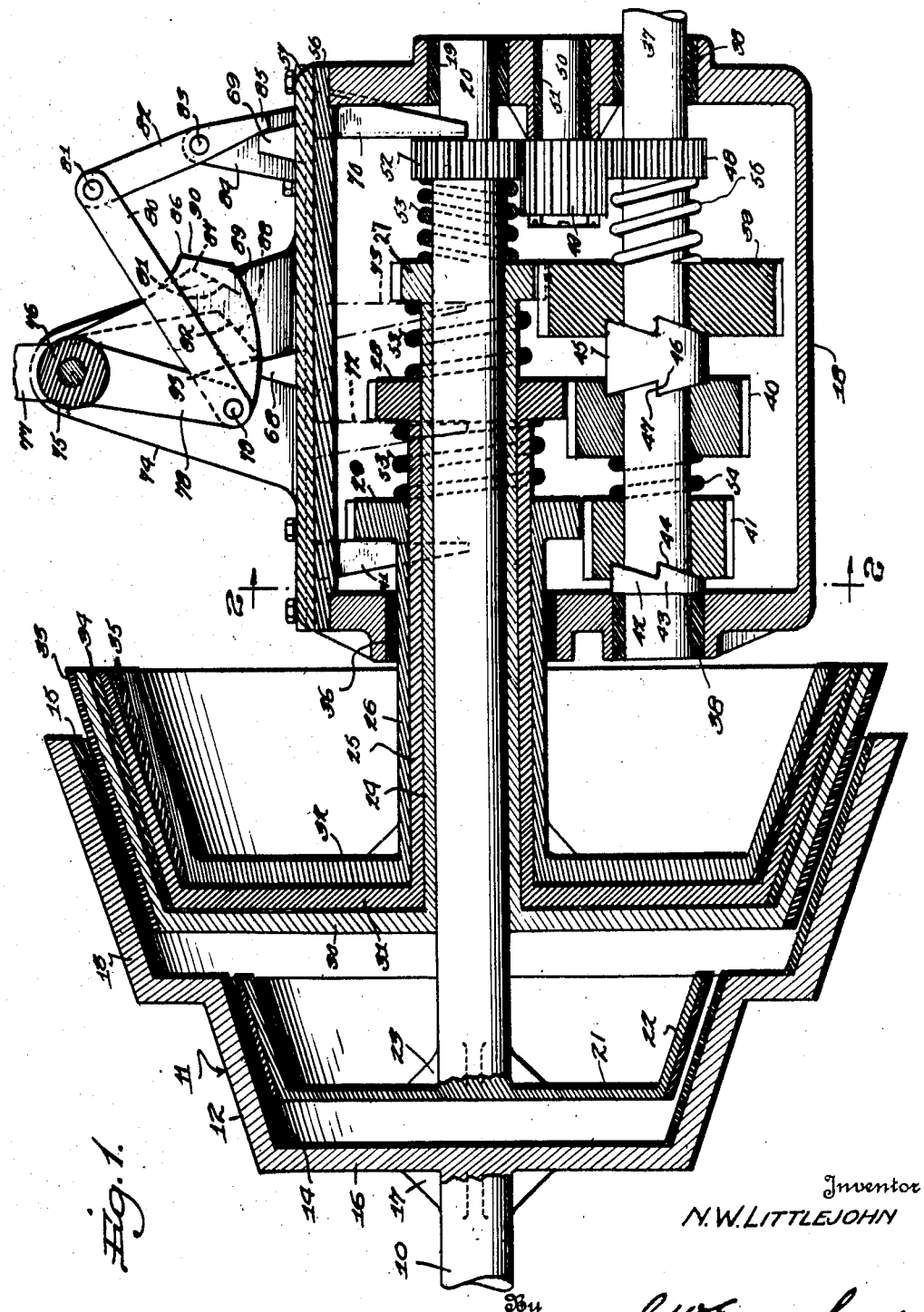

1,778,365

UNITED STATES PATENT OFFICE

NORMAN W. LITTLEJOHN, OF NEOSHO, MISSOURI

TRANSMISSION

Application filed August 3, 1927. Serial No. 210,417.

This invention relates to transmissions and more particularly to transmissions for motor vehicles.

An important object of the invention is to provide a transmission which is completely operable by a single lever, thus eliminating the necessity for the combined operation of the ordinary clutch pedal and gear shift lever.

A further object is to provide a transmission employing a plurality of constantly meshed gears which are adapted to be progressively rendered operable to vary the speed ratio between the power shaft and the driven shaft.

A further object is to provide a plurality of gears constantly meshing with corresponding gears mounted upon a driven shaft, the first set of gears being adapted to be rendered progressively operable by controlling clutch members associated with the power shaft.

A further object is to provide a transmission of the character referred to which is particularly adaptable for use in connection with motor vehicles and embodying a plurality of forward speed changes and reverse gearing, the gears of the transmission being constantly meshed thus eliminating the possibility of stripping the gears as in the case of the usual type of gear shift transmission.

A further object is to provide a plurality of telescoping sleeves each of which is provided with a gear and a clutch element, novel means being employed for rendering the clutch elements progressively operable for transmitting power from the drive shaft to a driven shaft through the gears referred to.

A further object is to provide a transmission wherein the several speed shifting operations may take place without disconnecting the power shaft from the transmission shaft, thus eliminating loss of momentum when shifting from high to intermediate or from intermediate to low speeds when ascending hills, or traveling on soft or muddy roads.

A further object is to provide a transmission having a control handle which is movable in a single line to effect a change to the various speeds without the necessity of moving the handle to the right and left as in the case of the usual gear shift devices.

Other objects and advantages of the invention will become apparent during the course of the following description.

In the drawings I have shown one embodiment of the invention. In this showing:—

Figure 1 is a central vertical longitudinal sectional view through the transmission, the parts being shown in neutral position, Figure 2 is a vertical section on line 2—2 of Figure 1, Figure 3 is a detail section taken substantially on line 3—3 of Figure 2.

Figure 4 is a detail perspective of the high speed shifting element,

Figure 5 is a detail perspective of one of the driven shaft gears and associated ratchet members, and Figure 6 is a detail perspective of the reverse shifting member.

Referring to the drawings the numeral 10 designates the power shaft, which will be the crank shaft of an internal combustion engine when the device is used as a transmission for motor vehicles. The crank shaft is provided with a fly wheel indicated as a whole by the numeral 11 and including a pair of conical clutch members 12 and 13 provided with suitable inner clutch facings 14 and 15. The fly wheel includes a disk portion 16 at its forward end which is preferably formed integral with the crank shaft and may be suitably braced with respect thereto by integral webs 17.

A transmission casing 18 is arranged rearwardly of the fly wheel and is provided in its rear end with a bearing 19 in which is journalled a shaft 20. This shaft extends forwardly through the transmission casing and is provided at its forward end with a preferably integral cone clutch 21 having a suitable clutch facing 22 adapted to engage the clutch facing 14 previously described. Web reinforcing elements 23 may be connected between the clutch 21 and shaft 20 and formed integral therewith.

A plurality of telescoping sleeves 24, 25 and 26 respectively surround the shaft 20 and are adapted to rotate with respect thereto. The inner sleeves progressively increase in length and the sleeves are provided at their rear ends with gears 27, 28 and 29 respectively which are of progressively increasing diameters to transmit varying speeds as will become apparent. The sleeves are further provided at their forward ends with clutches 30, 31 and 32 respectively and these clutches, in turn, are provided with suitable clutch facings 33, 34 and 35. The clutch face 33 is adapted to engage the clutch face 15, while the clutch faces 34 and 35 are adapted to engage the clutches 30 and 31 respectively under certain conditions to be described. The outer sleeve 26 is journalled in a bearing 36 carried by the forward end of tht transmission housing, as shown in Figure 1.

A driven or propeller shaft 37 extends through the transmission housing and is journalled in suitable bearings 38 carried thereby. The rear end of the driven shaft projects beyond the transmission casing for suitable connection with the rear wheels of the vehicle in the usual manner. A plurality of driven gears 39, 40 and 41 is mounted upon the shaft 37, the gears referred to being of progressively decreasing diameters and meshing with the gears 27, 28 and 29. The driven gears are substantially wider than their associated gears so that the latter are adapted to partake of material sliding movement without disengagement between the gears. A positive clutch member 42 is secured to the shaft 37, or formed integral therewith, adjacent its forward end, and is provided with ratchet teeth 43 adapted to engage similar ratchet teeth 44 formed in the forward gear 41. Similarly, a clutch member 45 is arranged between the gears 39 and 40 and is provided with teeth 46 adapted to engage teeth 47 formed in the adjacent faces of the gears 39 and 40. A reverse driving gear 48 is secured to the shaft 37 adjacent its rear end and meshes with a pinion 49 carried by a shaft 50 journalled in the transmission housing as at 51. The pinion 49 meshes with a gear 52 mounted upon the shaft 20, as shown in Figure 1. Referring to the latter figure, it will be noted that coil springs 53 surround the several drive sleeves and the shaft 20 between the adjacent pairs of gears carried by these elements whereby these gears are normally urged apart. Similarly a coil spring 54 is arranged between the gears 40 and 41 and another spring 55 is arranged between the gears 39 and 48 for the same purpose.

The top of the gear casing is closed by a head 56 to which is bolted a plate 57 having a plurality of undercut guide grooves 58 therein corresponding to the number of the gears 27, 28, 29 and 52. Shifting members 59, 60, 61 and 62 are mounted in the guide grooves 58, each shifting member being provided with a lower laterally extending pair of guide flanges 63 slidable in the grooves 58. Each of the shifting members is provided with a central thickened portion 64. Part of the thickened portion of each shifting member except the member 60 is slotted as at 65 and bent upwardly as at 66, for a purpose to be described. The member 66 of each shifting member forms a locking device the operation of which will be referred to later. Each locking device is provided with a depending tapered locking member 67 and an upper operating lug 68. The member 60 constitutes the reverse shifting device and is slidable in its guide 58, but is not provided with a locking device as in the case of the other shifting members. The reverse shifting member is provided with an operating lug 69, similar to the lugs 68 previously described, and is further provided with a depending arm 70 adapted to engage the gear 52 to slide it longitudinally for a purpose to be described. Similarly, the shifting members 59, 61 and 62 are provided with depending arms 71, 72 and 73 adapted to engage the gears 29, 28 and 27 to move these elements rearwardly under certain conditions to be referred to later.

Referring to Figures 1 and 2, the numeral 74 designates a pair of upstanding bearing ears through which extends a shaft 75 supporting a hub 76 arranged transversely of the transmission. This hub is provided with a preferably integral operating handle or lever 77 adapted to be controlled and shifted by the operator of the vehicle. A depending arm 78 is preferably formed integral with the hub 76 and is pivotally connected at its lower end as at 79 with a link 80. The rear end of this link is pivotally connected as at 81 to the upper end of a lever 82, as shown in Figure 1. The lever 82 is pivotally connected intermediate its ends as at 83 to a pair of upstanding ears 84 carried by the guide plate 57. The lower end 85 of the lever 82 is arranged rearwardly of the lug 69 and is adapted to shift this lug and the shifting member 60 forwardly when the lever 77 is moved forwardly from the neutral position shown in Figure 1.

High, intermediate and low shifting cams 86, 87 and 88 depend from the hub 76 to engage the lugs 68. Each of the cams is provided with a lower concentric portion 89, the concentric portion of the high speed cam being relatively long, as shown in Figure 1. Beyond its concentric portion this cam drops off as at 90, and when this portion is arranged over its corresponding lug 68, the latter is adapted to move upwardly, as indicated in Figure 4. The intermediate cam is provided with a concentric portion which is somewhat shorter than that of the high speed cam, and drops off as at 91. The low speed cam is provided with the shortest concentric portion, and the lower edge of this cam drops off as indicated at 92. From the point 93 forwardly, the lower edges of all of the cams are concentric and hence forward movement of the lever 77 from the position shown in Figure 1 holds the lugs 68 in the normal position shown. As indicated in Figure 3, the top 56 of the transmission casing is provided with a plurality of recesses 94 having inclined forward and rear faces corresponding to and adapted to engage the faces of the locking members 67. It will be apparent that when the lugs 68 are depressed, the members 67 will be arranged in the recesses 94 and will be locked in such position to prevent longitudinal movement of the gears 27, 28 and 29.

The operation of the apparatus is as follows:

With the parts in the position shown in Figure 1, the clutch 21 will be disengaged from the clutch 12 and no movement will be transmitted to the shaft 20. The clutches 30, 31 and 32 will not be in engagement with each other nor in engagement with the clutch 13, and no movement will be transmitted to the sleeves 24, 25 and 26. Thus all the elements in the device will be in neutral position. When it is desired to reverse the vehicle the lever 77 is moved forwardly causing the concentric portions of the cams to travel over the tops of the lugs 68, thus holding the locking members 67 in engagement with the recesses 94 and preventing sliding movement of the shifting members. The springs 53 tend to move the gears 27, 28 and 29 forwardly, but this forward movement is prevented by the arms 71, 72 and 73. The movement of the lever 77 referred to swings the lower end of this lever and the link 80 rearwardly, thus operating the lever 82 in such a manner that the lower end 85 thereof presses against the lug 69 to move the shifting member 60 forwardly. This action causes the arm 70 to slide the gear 52 and shaft 20 forwardly against the tension of the rear spring 53, thus bringing the clutch 21 into engagement with the clutch 12 to drive the shaft 20. Rotation of the shaft 20 is transmitted to the driven shaft 37 through gears 49 and 48 and thus the vehicle will move rearwardly. The shifting of the member 60 may take place gradually to bring a gradual engagement between the clutch members referred to thus preventing a sudden positive engagement between the drive and driven shafts. The arrangement of the teeth of the clutch members 42 and 45 is such that rotation of the shaft 37 positively drives the gears 39, 40 and 41 and their corresponding drive gears. The latter gears, and their corresponding shafts, are adapted to rotate freely with respect to each other and under the conditions referred to, are free to rotate with respect to the clutch 13.

When it is desired to drive the vehicle forwardly the lever 77 is slowly moved rearwardly from the position shown in Figure 1. This action brings the bevel face 92 gradually into position over its corresponding lug 68 thus permitting the latter to spring upwardly. The concentric portions of the other cams will hold their corresponding lugs 68 downwardly and hence only the shifting member 61 and its corresponding arm 73 will be released. The rear spring 53 exerts a greater force against the gear 27 than the next adjacent spring 53, and hence the gear 27 will be moved forwardly sliding the arm 73 and its corresponding shifting member 61 forwardly. Thus the sleeve 24 will move forwardly to bring the clutch facing 33 into engagement with the clutch facing 15, and hence the sleeve 24 and gear 27 will be rotated. The other clutches 31 and 32 will remain inoperative. The action referred to causes the gear 27 to drive the gear 39 and the latter gear drives the shaft 37 through the clutch member 45. Further rearward movement of the lever 77 brings the next bevel cam face 91 over its corresponding lug 68 whereupon the shifting member 62 will be released and the gear 28 will move forwardly sliding with it the arm 72 and shifting member 62. The clutch facing 34 of the clutch 31 will then engage the clutch 30 to be driven thereby, and this action causes the sleeve 25 and the gear 28 to be rotated and thus drive the gear 40. The latter gear drives the shaft 37 through the clutch member 45. Under the conditions referred to the gear 40 will be driven at a higher speed than the gear 39, and consequently the teeth of the latter gear will escape over the corresponding teeth 46 of the clutch member 45. In a similar manner the transmission may be placed in high speed position by further rearward movement of the lever 77, this action bringing the beveled cam face 90 over its corresponding lug 68 of the shifting member 59, thus releasing the latter shifting member and its corresponding arm 71, whereupon the sleeve 26 will move forwardly. This action brings the clutch facing 35 into engagement with the clutch 31 and all of the clutch members 13, 30, 31 and 32 will be locked together to rotate as a unit. Under such conditions the gear 41 will rotate at a higher speed than either of the gears 39 or 40 and consequently the teeth of the latter gears will escape over the gears of the clutch member 45. The escapement referred to is permitted by the springs 54 and 55. During the actions just referred to it will be apparent that the rear spring 53 holds the gear 52 in its rearward position thus preventing the clutch 21 from engaging the clutch 12. The parts of the device may be returned to neutral position merely by moving the lever 77 back to the position shown in Figure 1. The bevel cam faces 90, 91 and 92 will be progressively brought into engagement with their corresponding lugs 68 thus pressing these members downwardly and causing the shifting members to move rearwardly to locking position by virtue of the inclined engaging faces of the locking members 67 and recesses 94. This movement to locking position is facilitated by the fact that the bevelled cam faces referred to are moving rearwardly as the lever 77 is returned to normal position.

From the foregoing it will be apparent that the single lever 77 may be employed for placing the parts of the device in reverse, low, intermediate or high speed driving positions, without the use of a separate clutch pedal, and since the gears of the device are constantly in mesh these elements cannot be stripped as in the case of the usual gear shifting mechanisms.

It is to be understood that the form of the invention herewith shown and described is to be taken as a perferred example of the same and that various changes in the shape, size and arrangement of parts may be resorted to without departing from the spirit of the invention or the scope of the subjoined claims.

I claim:

1. A transmission comprising a casing, a driven shaft journalled in said casing, a plurality of gears carried on said driven shaft, means operable upon rotation of said gears in one direction for connecting them to said driven shaft, a second shaft mounted in said casing parallel to said first shaft, a pinion carried by each of said shafts, a pinion mounted between and meshing with each of said first named pinions, a plurality of sleeves rotatably surrounding said second shaft, a gear carried by one end of each sleeve and meshing with one of said first named gears, said second shaft and said sleeves being longitudinally slidable with respect to each other, spring means tending to urge said second shaft in one direction and said sleeves in the other direction, a drive shaft, a pair of clutch elements carried by said drive shaft, a clutch element carried by said second shaft and adapted to engage one of the clutches of said drive shaft, means for moving said second shaft against the tension of said spring means to bring said last mentioned clutch elements into engagement with each other, a clutch element carried by each of said sleeves, the other clutch element of said drive shaft and said last mentioned clutch elements being adapted to be progressively brought into engagement with each other upon the release of said sleeves from the tension of said spring means, locking means for each of said sleeves to prevent movement thereof, and means for progressively releasing said locking means.

2. A device constructed in accordance with claim 1 wherein said casing is provided with a plurality of notches, said locking means comprising a shifting device having a portion adapted to engage each of said notches and including an arm operatively associated with each gear to hold it against the tension of said spring means when said portion of the shifting device is in engagement with one of said notches.

3. A device constructed in accordance with claim 1 wherein said casing is provided with a plurality of notches, said locking means comprising a plurality of shifting devices each having a portion adapted to engage each of said notches and including an arm operatively asscciated with one of said last named gears to hold it against the tension of said spring means when said portion of the shifting device is in engagement with one of said notches, a lug carried by each shifting device, a plurality of cams adapted to engage said lugs, and means for rotating said cams to progressively release said lugs whereby the portions of said shifting devices in engagement with said notches will be released therefrom.

In testimony whereof I affix my signature.

NORMAN W. LITTLEJOHN.